United States Patent [19]

Haught et al.

[11] 4,156,307
[45] May 29, 1979

[54] FABRICATION PROCESS FOR NONCIRCULAR VACUUM SEAL

[75] Inventors: Alan F. Haught, Glastonbury; David J. McFarlin, Ellington; Richard F. Dondero, South Meriden, all of Conn.

[73] Assignee: United Technologies Corporation, Hartford, Conn.

[21] Appl. No.: 884,680

[22] Filed: Mar. 8, 1978

[51] Int. Cl.² .............................................. B23P 19/00
[52] U.S. Cl. ..................... 29/428; 29/526 R; 277/1; 285/321; 29/DIG. 34; 409/145
[58] Field of Search ............... 29/428, 526, DIG. 34; 90/11.42; 277/1; 285/321

[56] References Cited

U.S. PATENT DOCUMENTS

| | | | |
|---|---|---|---|
| 1,348,667 | 8/1920 | Snyder | 277/1 X |
| 2,980,284 | 4/1961 | Gill et al. | 29/DIG. 34 UX |
| 3,058,750 | 10/1962 | Taylor | 277/1 |
| 3,079,188 | 2/1963 | Oswold | 285/321 X |
| 3,405,957 | 10/1968 | Chakroff | 285/321 X |
| 3,440,703 | 4/1969 | Millhiser | 29/428 X |
| 3,600,895 | 8/1971 | Suter | 285/321 X |
| 4,087,120 | 5/1978 | Rumble | 285/321 X |

*Primary Examiner*—Charlie T. Moon
*Attorney, Agent, or Firm*—Edward J. Timmer

[57] ABSTRACT

An improved process for fabricating a sealing flange assembly useful for oval and other noncircular access ports in high vacuum equipment is disclosed. The process is applicable to sealing flange assemblies of the type which include relatively hard metallic flange members having opposed, mating surfaces at least a portion of which are chamfered to define a V-shaped notch therebetween and a relatively soft metallic sealing member disposed in the notch under compression against the chamfered surfaces. The process relates specifically to the machining of the chamfered sealing surfaces by a milling process which utilizes a specially ground end mill and selected depths of cut to provide a more or less grooved sealing surface profile essentially devoid of tool chatter marks and metal folds which represent nonsealable surface defects. The as-milled chamfered sealing surfaces are much coarser (32$\mu$ inch finish) than those produced by grinding (8$\mu$ inch finish) but nevertheless are effective in maintaining a vacuum tight condition in the assembly at a pressure level of $8 \times 10^{-8}$ torr whereas the ground, finer finish sealing surfaces are not.

2 Claims, 4 Drawing Figures

VACUUM SIDE

FABRICATION PROCESS FOR NONCIRCULAR VACUUM SEAL

BACKGROUND OF THE INVENTION

1. Field of the Invention

The present invention relates to vacuum seal construction and, more particularly, to techniques for fabricating a sealing flange assembly useful for oval-like and other noncircular ports in high vacuum equipment.

2. Description of the Prior Art

Vacuum vessels of various sizes and shapes are used in a wide variety of well-known commercial as well as developmental processes. In these situations, it is usually necessary that access means in the form of ports, openings and the like be provided to enable entry into the vessel interior for repairs, adjustments, workpiece removal and the like. The access ports are generally circular or oval-like in cross-section, although other shapes can of course be used. These ports must be provided with suitable vacuum sealing means, such as cover plates, doors and the like, during normal operation of the equipment.

In the past, it has been found expedient to construct the sealing surfaces of circular vacuum sealing flanges by a machining process of the turning type. A typical and well-known sealing flange amenable to fabrication by turning is shown in FIG. 13 in the Final Report UTRC-76-122 prepared under purchase order agreement with the University of Texas under United States Energy Research And Development Administration Contract E(40-1)4478. However, for oval-like and other noncircular seal shapes, this type of machining process is not available since the shape has no rotational symmetry. It is known that grinding and/or polishing offer processes by which noncircular vacuum seal flanges can alternatively be machined. These have been commonly thought to be optimum processes for fabricating vacuum sealing surfaces as a result of the very fine surface finish produced on metallic flange members, a surface finish of $8\mu$ inch being representative of these processes. Although the surface finish obtainable by milling is usually inherently more coarse than that produced by grinding and/or polishing, milling also has been suggested as an alternative machining process, specifically for a sealing flange assembly which includes relatively hard metallic flange members having opposed, mating surfaces at least a portion of which are chamfered to define a V-shaped notch therebetween and a relatively soft sealing member disposed in the notch under compression against the chamfered surfaces, for example, see FIG. 13 of the above-cited Final Report UTRC-76-122.

SUMMARY OF THE INVENTION

The present invention relates to the discovery that in fabricating an oval-like and other noncircular sealing flange assembly of the type just described, the chamfered sealing surfaces can be machined by milling even though the surface finish obtained is more coarse than that produced by grinding and/or polishing, so long as harmful tool chatter marks at the transitions between linear and arcuate portions of the sealing surfaces are essentially eliminated and so long as metal folds resulting from tool mark roll-over are also essentially eliminated. It has been found that these features, that is, chatter marks and metal folds, represent nonsealable surface defects when the soft metallic sealing member is compressed against the chamfered sealing surface.

In accordance with the present invention, such milling is effected by a specially ground end mill having a central axis of rotation aligned substantially normal to the mating surface of the flange member and having at least one cutting edge oriented at such an angle relative to the central mill axis that the desired degree of chamfer is produced when the aligned end mill is brought into cutting engagement with the mating surface. The alignment of the central axis of rotation of the end mill normal to the mating surface not only insures that a uniform chamfer is maintained at arcuate as well as linear portions of the sealing surface but also that harmful tool chatter marks are not formed on the sealing surface as the end mill traverses between linear and arcuate portions. Milling is effected with the end mill in a plurality of cutting passes, the latter of which are sufficiently limited in the depth of cut to avoid tool mark roll-over and resultant formation of metal folds on the sealing surface.

The foregoing and other objects, features and advantages of the present invention will become more apparent in the light of the following detailed description of preferred embodiments thereof as discussed and illustrated in the accompanying drawings.

DESCRIPTION OF PREFERRED EMBODIMENTS

Figure 1:
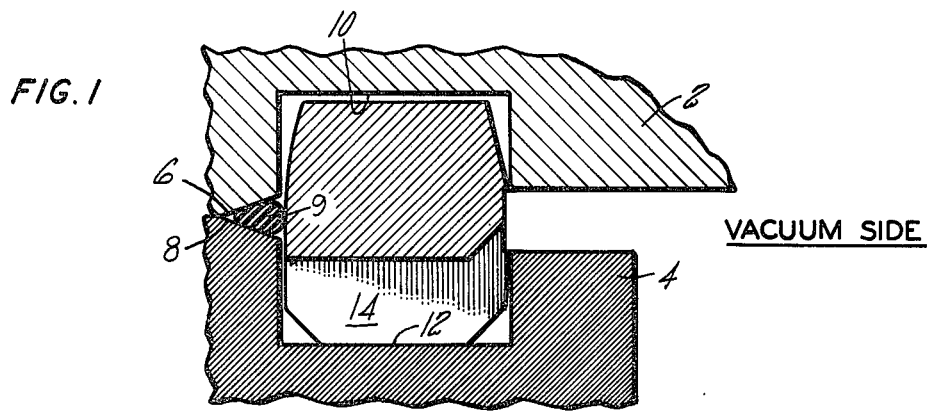
FIG. 1 is a cross-sectional view of a sealing flange assembly to which the invention is especially applicable.

Referring first to FIG. 1, a sealing flange assembly especially amenable to fabrication in oval or other non-circular cross-sectional shapes by the milling process of the invention is shown. The assembly includes relatively hard metallic (stainless steel) flange members 2 and 4 having opposed, mating working surfaces. A portion of the surfaces are shown as chamfered sealing surfaces 6 and 8 which define a V-shaped notch therebetween when the flange members are placed in working relation. Disposed in the notch under compression against the chamfered sealing surfaces is a relatively soft metallic (copper) sealing member 9, for example, in the form of wire of oval shape for an oval-shaped sealing flange. The flange assembly is placed in compression by tightening bolts (not shown) or other similar means disposed around the perimeter of the flange members. On the vacuum side of the flange assembly there are shown opposed machined grooves 10 and 12 in which a back-up member 14 is disposed to maintain the sealing member 9 in position in the V-shaped notch during assembly and compression of the seal. As a result of the spacing between flange members 2 and 4 on the vacuum side of the seal and the configuration of the back-up member 14, the volume defined by the grooves 10 and 12 and the back-up member on the vacuum side of the seal can be evacuated.

Figure 2A:
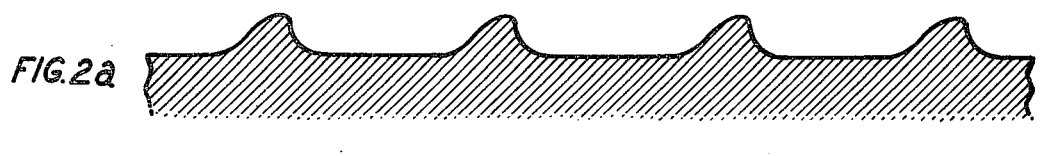
FIG. 2a and 2b represent schematic cross-sections of sealing surface profiles produced by the invention and grinding, respectively.
Figure 2B:
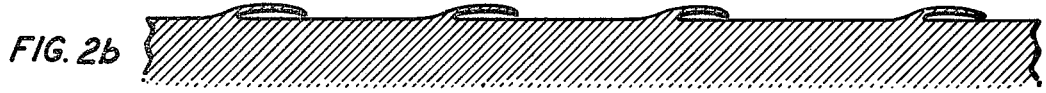
Figure 3:
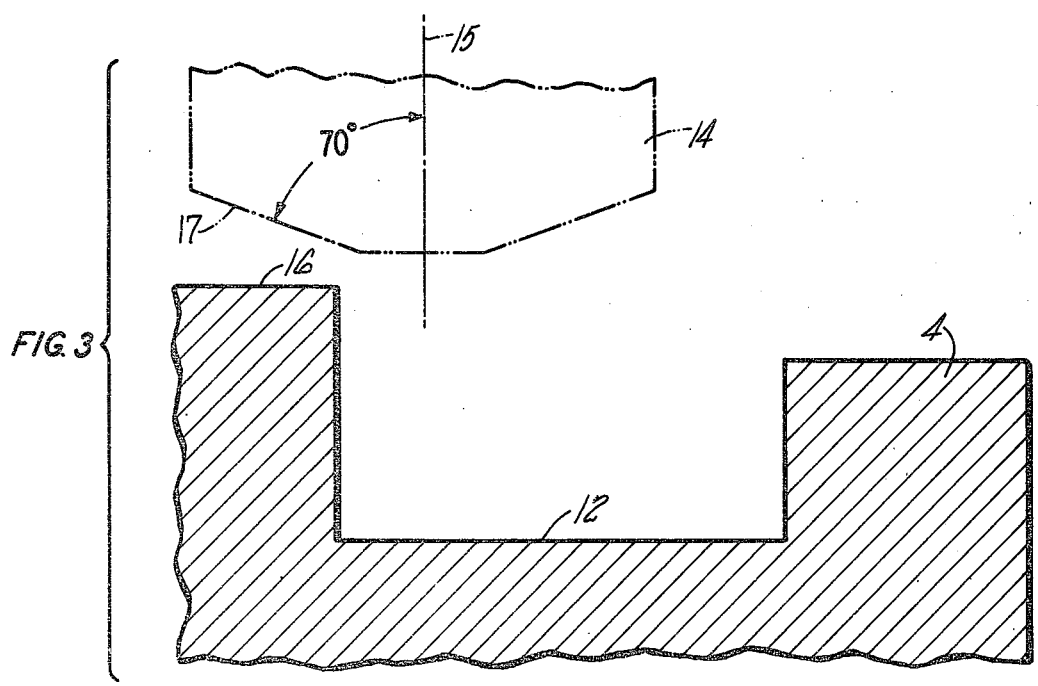
FIG. 3 is a schematic view showing the specially ground end mill and its orientation relative to the mating surface of the flange member.

In accordance with the method of the present invention, the chamfered sealing surfaces 6 and 8 of the mating flange members are machined by a milling process which utilizes a specially ground end mill and critical depth of cuts to substantially eliminate tool chatter marks and metal folds resulting from tool mark roll-over which features have been discovered to represent nonsealable surface defects when the soft sealing member 9 is compressed thereagainst to effect sealing action. It has been discovered that a milled sealing surface produced by the machining process of the invention will provide suitable metal-to-metal sealing action to pressure levels of about $8 \times 10^{-8}$ torr, even though the surface finish, for example, $32\mu$ inch as-milled, is much more coarse than that obtained by grinding and/or polishing, the important feature of the invention being the production of a more or less grooved surface profile on the sealing surfaces essentially devoid of harmful tool chatter marks and metal folds, see FIG. 2a. As used herein, metal folds resulting from tool mark roll-over are surface defects in the form of curled projections of metal, see FIG. 2b, the interiors of which projections are not effectively sealed when the soft sealing member is compressed. Tool chatter marks are well known and fully described in the art. Referring to FIG. 3, the specially ground end mill 14 is shown as having a central axis of rotation 15 aligned substantially normal to the mating surface 16 to be chamfered and having at least one cutting edge 17 oriented at such an angle relative to the central mill axis that the desired degree of chamfer is produced when the end mill is brought into cutting engagement with the surface. Usually, the groove 12 (or 10) is milled prior to machining the chamfered sealing surface. In producing a 20° chamfered sealing surface on stainless steel flange members, a 3 or 4-flute tool steel end mill specially ground to have a cutter included angle of 140° has been successfully used, the included angle being the angular relation between the rotational axis of the end mill and the cutting edge (70°) multiplied by two. The use of the specially ground end mill provides several important advantages. First, as a result of the alignment between the central mill axis and mating surface to be machined, a uniform chamfer will be produced regardless of whether an arcuate or linear portion of the sealing surface is being machined. Second, harmful tool chatter marks are essentially prevented as the end mill traverses between linear and arcuate portions of the surface.

In addition, it is important that milling be carried out in a plurality of cutting passes, the latter passes being of a depth sufficiently limited to prevent tool mark roll-over and resultant metal folds from forming on the sealing surface. Typically, in milling the stainless steel flange members with a 20° chamfered sealing surface, a four-pass cutting operation is utilized after the rough oval or noncircular shape of the seal is milled. The first and second cutter passes are limited to removal of 0.028 inch of material at a tool feed rate of 1.5 in./min. The third pass removes 0.010 inch of material at a tool feed rate of 1.0 in./min. The fourth and final pass is made without adjustment to the milling machine and ensures removal of small amounts of material remaining on the surface as a result of tool or workpiece springback. It has been determined that the use of deeper final cuts results in an unacceptable seal surface having harmful tool mark roll-over. The as-milled sealing surface is characterized by the surface profile shown schematically in FIG. 2a, the surface having tool marks (grooves) of $32\mu$ inch depth which are aligned normal to the sealing member when the flange components are assembled.

A sealing flange assembly of the type shown in FIG. 1 and having an oval cross-sectional shape has been machined in accordance with the invention and assembled by placing an OFHC copper sealing member of oval shape and circular cross-section in the V-shape notch formed by the chamfered sealing surfaces. After the flange assembly was compressed by tightening spaced bolts around the flange periphery, a vacuum was drawn inside the vessel to a pressure level of $8 \times 10^{-8}$ torr. It was found that the seal was vacuum tight at this level. In contrast, a similar flange assembly, however, of circular cross-sectional shape, was fabricated by grinding the chamfered sealing surface to a finish of $8\mu$ inch and then assembled and evacuated. The seal proved not to be vacuum tight at this level of pressure by a helium leak test. The failure of the ground assembly was attributed to the presence of metal folds on the sealing surface, which folds were not effectively sealed by the compressed copper sealing member.

Although this invention has been shown and described with respect to a preferred embodiment thereof, it should be understood by those skilled in the art that various changes and omissions in the form and detail thereof may be made therein without departing from the spirit and scope of the invention.

We claim:

1. In fabricating a sealing flange assembly useful for oval-like and other noncircular access openings in vacuum equipment, wherein the flange assembly includes relatively hard metallic flange members having opposed, mating surfaces at least a portion of which are chamfered to define a V-shaped notch therebetween and a relatively soft metallic sealing member disposed in the notch under compression against said chamfered surfaces to effect sealing action, the steps of:

(a) milling the mating surface of each flange member to provide the chamfered sealing surface of the desired noncircular configuration and characterized by a grooved surface profile essentially devoid of tool chatter marks and metal folds resulting from tool mark roll-over which represent nonsealable surface defects when the soft sealing member is compressed thereagainst, such milling being effected by an end mill having a central axis of rotation aligned substantially normal to said mating surface to insure uniform chamfer at arcuate as well as linear portions of the sealing surface and also to prevent harmful tool chatter marks on the sealing surface at the transition between linear and arcuate portions, said end mill including at least one cutting edge oriented at such an angle relative to the central mill axis that the desired degree of chamfer is produced when the aligned end mill is brought into cutting engagement with the mating surface, said milling being conducted in a plurality of cutting passes the latter of which are sufficiently limited in the depth of cut to substantially preclude formation of harmful metal folds on the surface resulting from tool mark roll-over; and (b) assembling the machined flange members and soft sealing member so that the mating surfaces, including the chamfered sealing surfaces, are in working relationship, the sealing member being disposed between said chamfered surfaces in the notch defined thereby, and compressing the assembly to press the soft sealing member into and against the opposed as-milled chamfered surfaces and thereby establish a vacuum tight seal, intimate contact between the sealing member and chamfered sealing surfaces being facilitated by the absence of nonsealable chatter marks and metal folds on said as-milled surfaces.

2. The method of claim 1 wherein the mating surface of each flange member is rough machined to the approximate noncircular configuration and then milled to final shape and surface profile in the plurality of cutting passes with the specially ground end mill.

* * * * *